(12) United States Patent
Villarreal et al.

(10) Patent No.: US 8,950,329 B2
(45) Date of Patent: Feb. 10, 2015

(54) ELECTRICALLY OPERATED PROPELLANTS

(71) Applicants: James K. Villarreal, Tucson, AZ (US); Richard D. Loehr, Tucson, AZ (US)

(72) Inventors: James K. Villarreal, Tucson, AZ (US); Richard D. Loehr, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 331 days.

(21) Appl. No.: 13/726,462

(22) Filed: Dec. 24, 2012

(65) Prior Publication Data

US 2014/0174313 A1 Jun. 26, 2014

(51) Int. Cl.
*F02K 9/94* (2006.01)
*C06B 33/06* (2006.01)

(52) U.S. Cl.
CPC .. *C06B 33/06* (2013.01); *F02K 9/94* (2013.01)
USPC ........................................ 102/202; 102/202.9

(58) Field of Classification Search
USPC ......... 102/530, 531, 202, 202.1, 202.5, 202.9
See application file for complete search history.

(56) References Cited

U.S. PATENT DOCUMENTS

| | | | |
|---|---|---|---|
| 3,632,458 A * | 1/1972 | Filter et al. | 149/19.3 |
| 4,023,995 A * | 5/1977 | Reed et al. | 149/19.3 |
| 8,114,229 B1 * | 2/2012 | Petersen et al. | 149/2 |
| 8,336,287 B1 * | 12/2012 | Petersen et al. | 60/219 |
| 2006/0011276 A1 | 1/2006 | Grix et al. | |
| 2009/0301601 A1 * | 12/2009 | Enerson et al. | 141/38 |
| 2011/0030859 A1 | 2/2011 | Sawka | |
| 2011/0067789 A1 | 3/2011 | Grix et al. | |
| 2011/0259230 A1 * | 10/2011 | Sawka et al. | 102/374 |
| 2012/0103479 A1 | 5/2012 | Katzakian et al. | |
| 2014/0109788 A1 * | 4/2014 | McPherson et al. | 102/202.9 |

OTHER PUBLICATIONS

"International Application Serial No. PCT/US2013/066555, International Search Report mailed Aug. 28, 2014", 4 pgs.
"International Application Serial No. PCT/US2013/066555, Written Opinion mailed Aug. 28, 2014", 6 pgs.

* cited by examiner

*Primary Examiner* — Drew Brown
(74) *Attorney, Agent, or Firm* — Schwegman Lundberg & Woessner, P.A.

(57) ABSTRACT

An electrically operated propellant is configured to ignite and extinguish over a range of pressures. In examples, the electrically operated propellant is included in a gas generation system having a combustion chamber and at least two electrodes coupled with the propellant. The electrically operated propellant is configured to ignite at an ignition condition and extinguish under an extinguishing condition. In the ignition condition an electrical input is applied across the electrodes to ignite the electrically operated propellant. In the extinguishing condition the electrical input is interrupted while the pressure within the combustion chamber is greater than 200 psi, and the ignited electrically operated propellant extinguishes.

27 Claims, 5 Drawing Sheets

ELECTRICALLY OPERATED PROPELLANTS

TECHNICAL FIELD

This document pertains generally, but not by way of limitation, to electrically operated propellants.

BACKGROUND

Missiles and rockets burn propellants within combustion chambers to generate pressurized gases. The pressurized gases are directed through a nozzle to provide thrust and accordingly propel the body of the missile or rocket. Solid rocket propellants are formed with a solid oxidizer, for instance ammonium perchlorate, plus fuels, additives and a binder ingredient. Ignition systems that elevate the temperature of the solid rocket propellant to the point of combustion are used to ignite the solid rocket fuel. After ignition of a solid rocket motor the reaction cannot be interrupted until the fuel is completely consumed. Additionally, the solid rocket propellant burns according to the shape of the propellant grain and its operating pressure which is dictated by the nozzle throat size. That is to say, burning of the fuel (the burn rate) proceeds according to a set of predefined parameters and these predefined parameters cannot be changed during launch and flight with the exception of use of a mechanical apparatus (such as a nozzle pintle). Stated another way, once the solid rocket propellant is initiated burning cannot be interrupted and there are limited means for providing launch based or in-flight control of the burn rate of the fuel.

One example of propellant configured for controllable burning in a low pressure environment (e.g., less than 200 psi) is shown in US Published Application 2011/0067789. An electrically controlled propellant is provided that is capable of sustained controllable combustion at ambient pressure. As discussed in the application at pressures of greater than 200 psi the propellant is self-sustaining. In other words, at these pressures the propellant continues to burn even with the interruption of electrical input to the propellant. In at least this regard, burning of the discussed electrically controlled propellant, like the solid rocket fuel discussed above, is not finished until the propellant is fully consumed.

OVERVIEW

The present inventors have recognized, among other things, that a problem to be solved can include providing electrically operated propellant formulations that are ignitable and extinguishable under a variety of conditions, including under high pressures within a rocket motor combustion chamber having pressures greater than 200 psi therein. In an example, the present subject matter can provide a solution to this problem with an electrically operated propellant comprising a liquid perchlorate based oxidizer, additives, a binder and a fuel, wherein the propellant is extinguished with the interruption of electrical input at pressures greater than 200 psi (for instance within a combustion chamber including the propellant therein). The electrically operated propellant that is selectively ignited and extinguished over a broad range of conditions facilitates the selective generation of thrust for a variety of applications. For instance, the electrically operated propellant is used in one example to provide staged burns for delivery of a launch vehicle to a target. In another example, the electrically operated propellant is extinguished where a catastrophic or mission compromising issue arises after launch. In still another example, the electrically operated propellant is selectively operated (ignited and later extinguished) on an as needed basis to provide attitude and control to a vehicle without consuming the entirety of the propellant at one time. In other examples, the electrically operated propellant is used to provide a near instantaneous source of pressurized gas (e.g., to drive a turbine, turn a fan, operate mechanical devices, cold or warm gas thruster operation, tank gas pressurization, or the like) that may be selectively switched on or off as needed.

In another example, the electrically operated propellant formulations described herein are configured to ignite with much lower applications of electrical input than other propellants. For instance, the electrically operated propellant formulations include metal based fuels that are mixed at a ratio with the liquid perchlorate based oxidizer to provide propellants having a specific energy of around 800 Joules per grain or less at ambient pressure. In order to ignite the electrically operated propellant an electrical input, such as a battery or generator, is needed that is coupled with the propellant. The characteristics of the electrical input are dictated at least in part by the specific energy of the propellant that equates roughly to the amount of electrical power needed to ignite the propellant. Some propellants have a specific energy of 2700 Joules per gram or more at ambient pressures and accordingly require a much larger battery (with attendant greater weight, volume foot print and the like) to ignite the propellant. Because the electrically operated propellant formulations include a mix of a liquid perchlorate based oxidizer at a defined ratio to the metal based fuel the specific energy of the formulations is much lower, around 800 Joules per gram, and accordingly minimizes the requirements for a battery (weight, power density, and the like). During operation at higher pressures, this specific energy requirement reduces to 200 Joules per gram or less for sustained electrically controlled burning. Importantly for weight and volume constrained applications, such as rocket motors, the overall weight and volume of the propellant and ignition system (e.g., the battery) is thereby minimized.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED

Figure 1A:
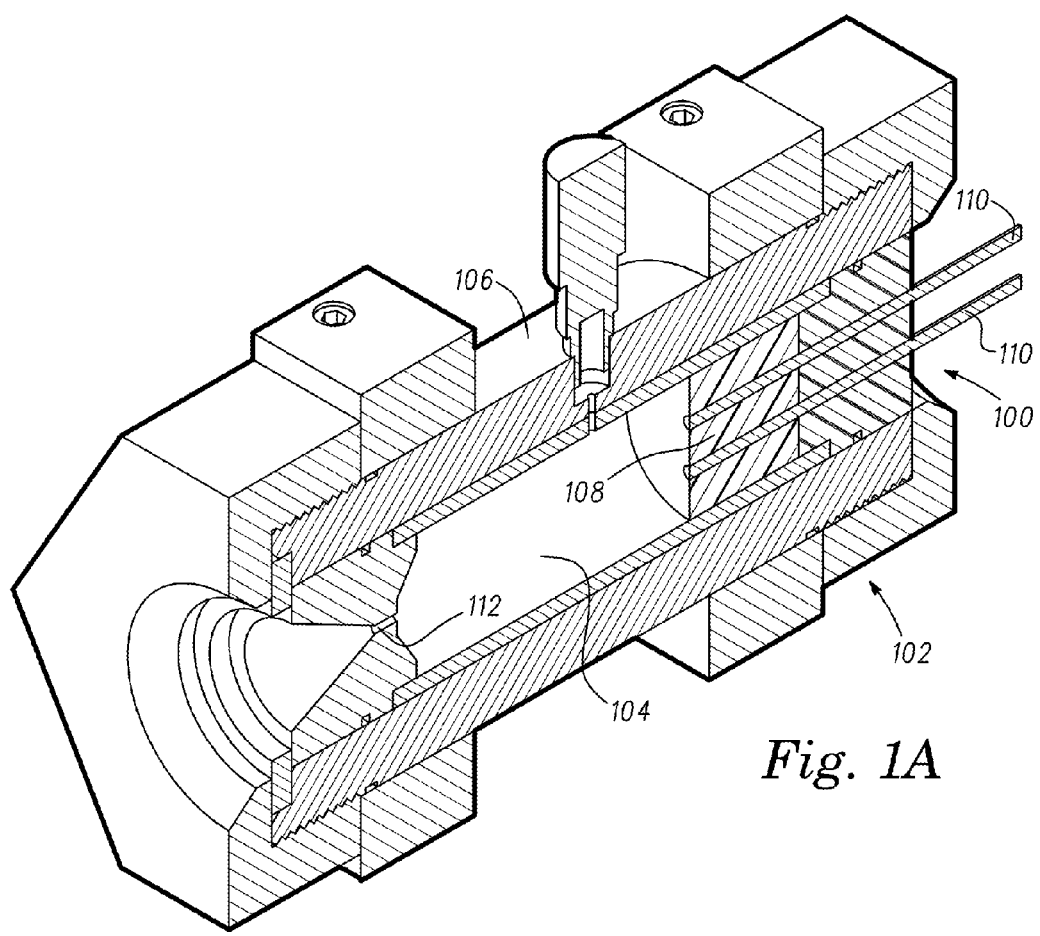
FIG. 1A is cross sectional view of one example of a gas generation assembly including an electrically operated propellant.
Figure 1B:
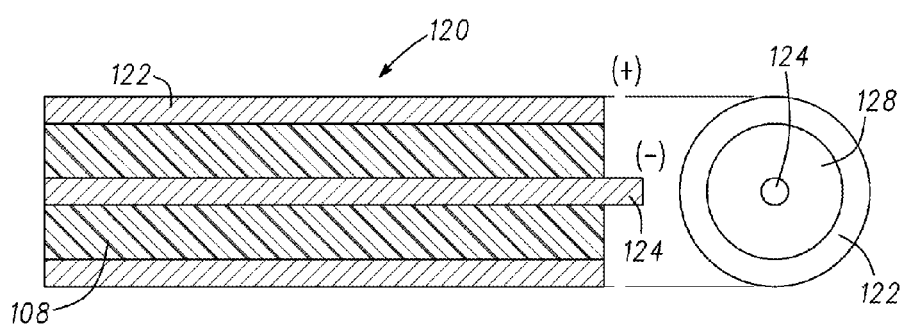
FIG. 1B is a dual schematic view of another example of a gas generation assembly including coaxial electrodes.

FIGS. 1A and 1B show two examples of gas generation systems 100, 120 that use an electrically operated propellant. Referring first to FIG. 1A, the gas generation system 100 is shown as part of an overall assembly, such as a rocket motor 102. In one example, the gas generation system 100 includes the rocket motor 102. The gas generation system includes propellant, such as an electrically operated propellant 108, configured to provide thrust through a rocket nozzle 112.

As shown in FIG. 1A, the gas generation system 100 includes a combustion chamber of 104 having an electrically operated propellant 108 positioned therein. Two or more electrodes 110 extend into the electrically operated propellant 108 within the combustion chamber 104. The electrically operated propellant 108 fills a portion of combustion chamber 104 and has a predetermined grain shape. In another example, the electrically operated propellant 108 fills substantially the entirety of the combustion chamber 104. That is to say, the electrically operated propellant 108 extends from the position shown in FIG. 1A toward a position in close proximity to the nozzle 112. Accordingly, the two or more electrodes 110 similarly extend through the electrically operated propellant 108 toward the nozzle 112.

As will be described herein the electrically operated propellant 108 includes a formulation that allows for the ignition and extinguishing of the propellant in a variety of conditions according to the application (and interruption of the application) of electricity through the electrodes 110. For instance, the electrically operated propellant 108 is configured to ignite with the application of voltage across the electrodes 110. Conversely, the electrically operated propellant 108 is extinguished with the interruption of the voltage at a range of pressures (e.g., from 0 psi to 2000 psi). For instance, where the combustion chamber 104 is part of the rocket motor 102, and the motor is in the process of generating thrust the pressure within the combustion chamber 104 is greater than 200 psi, for instance from 200 to 2,000 psi. In this condition, it may be desirable to interrupt the burn of the electrically operated propellant 108 (e.g., because of catastrophic or mission critical failures of the rocket). In such a circumstance the voltage applied across the electrodes 110 is interrupted. Despite the pressurized environment of the combustion chamber 104 subjecting the electrically operated propellant 108 to a pressure greater than 200 psi, for instance pressures approaching 2,000 psi, the interruption of voltage to the electrodes 110 allows the electrically operated propellant 108 to extinguish. With the electrically operated propellant 108 extinguished the generation of thrust is halted and the propellant is preserved for future use. That is to say, with the electrically operated propellant 108 described in further detail herein the gas generation systems 100, 120 are configured for ignition and extinguishing during operation. Importantly, even with ambient or high pressures within the combustion chamber 104, such as atmospheric pressure, pressures greater than 200 psi, 500 psi, 1000 psi, 1500 psi and up to 2000 psi the electrically operated propellant 108 is extinguished with the interruption of electricity (e.g., voltage or current) applied across the electrodes 110.

Referring now to FIG. 1B, another example of a gas generation system 120 is provided. As previously shown in FIG. 1A, the electrodes 110 extend as one or more rods, leads or the like through the electrically operated propellant 108. FIG. 1B shows another configuration for the electrodes. As shown the electrodes include a cylindrical electrode 122 extending around the electrically operated propellant 108 and a coradial electrode 124 (e.g., a rod, lead or the like) extending through the electrically operated propellant 108. As shown, for instance in the end view of the gas generating system 120, the electrode 124 is co-radial with the electrode 122. That is to say, the electrodes 122, 124 share a longitudinal axis extending along the length of the propellant 108. In other examples, the electrodes 122, 124 as well as the electrodes 110 shown in FIG. 1A are arranged in a variety of configurations depending on the orientation of the electrically operated propellant 108 within a combustion chamber configured to house the electrically operated propellant 108.

In one example, the electrically operated propellant 108 shown in FIGS. 1A, B is constructed with, but not limited to, three or more components including a liquid perchlorate based oxidizer, a binder, and a fuel that form a solid propellant as described herein. As will be further described herein, the combination of these three components in various proportions of the overall mass of the electrically operated propellant 108 tunes the operation of the electrically operated propellant 108 and ensures that the electrically operated propellant is configured for ignition and extinguishing at a variety of conditions. For instance, the electrically operated propellant 108 described herein including a liquid perchlorate based oxidizer, a binder and a fuel, such as a metal-based fuel, is configured to ignite (in an ignition condition) with the application of voltage across the electrodes 110 and at the same time is configured to extinguish (in an extinguishing condition) over a broad range of pressures within the combustion chamber 104 (pressures up to 2000 psi). That is to say, the formulation of the liquid perchlorate based oxidizer, a binder and the fuel are configured to facilitate the ignition of the electrically operated propellant 108 with the application of electricity and correspondingly extinguish the propellant 108 with the cessation of electricity even where the electrically operated propellant 108 is subjected to pressures greater than 200 psi. Stated another way, the electrically operated propellant 108 is not self-sustaining even at high pressures, such as pressures of 200 psi or more and less than 2000 psi. Accordingly, the electrically operated propellant 108 is configured for "on" and "off" operation under a variety of conditions, and is able to automatically shut off with the interruption of electricity.

Figure 2:
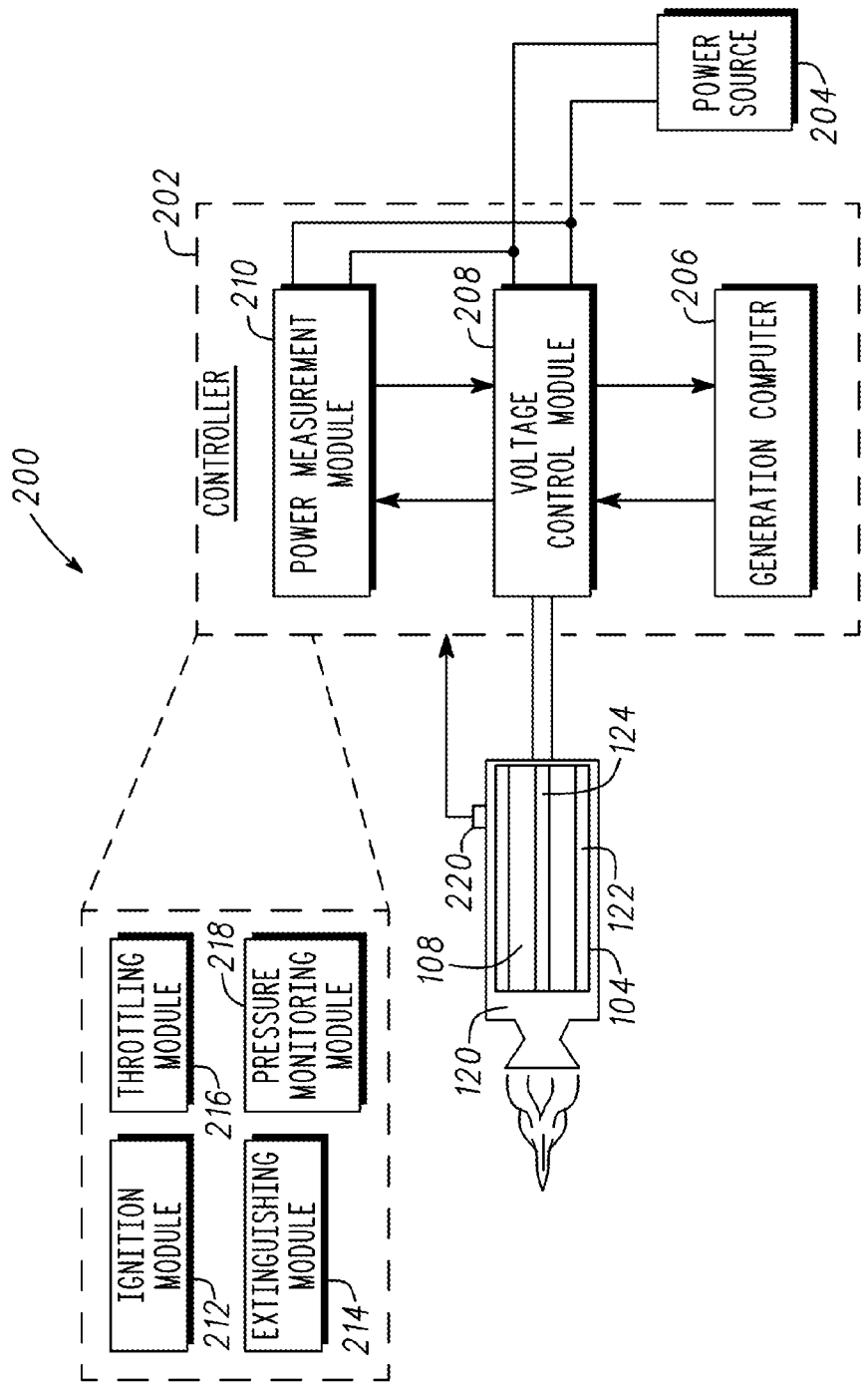
FIG. 2 is a schematic view of another example of a gas generation assembly including an electrically operated propellant.

FIG. 2 shows one example of a control system 200 for use with a gas generation system (including but not limited to systems 100, 120 as well as the other systems provided herein). In one example, the control system 200 is included as a part of the gas generation system 100 or the gas generation system 120. The control system 200 includes a controller 202 coupled with a power source 204. In one example, the power source includes, but is not limited to, an electrical power source such as a battery, generator or the like. As further shown in FIG. 2, the controller 202 is coupled with one of the gas generation systems. As shown the control system 200 is coupled with the gas generation system 120 including the electrically operated propellant 108. The control system 200 described herein as well as either of the gas generation systems 100, 120 are not intended to be limited to rocket motors 102 alone. Instead, the control system 200 and the gas generation systems 100 and 120 are instead configured for use where a source of pressurized gas is needed. As will be described herein, the gas generation systems 100, 120 are usable to provide a source of pressurized gas for a rocket motor 102, attitude and control systems, gas compressors, ignition systems and the like.

Referring again to FIG. 2, the controller 202 is shown as including in one example a generation module 206 (e.g., a flight module in an example where the system 100, 120 is used in a rocket). The generation module 206 is coupled with a voltage control module 208 and a power measurement module 210. In one example, the generation module 206 is a flight module, and the flight module is configured to control the amount of thrust provided by the gas generation system 120 as part of the rocket motor 102 shown in FIG. 1A. For instance, as ignition, extinguishing and throttling of thrust output from the gas generation system 120 is desired, the flight module 206 is configured to provide this control by way of management of the electrical output to the gas generation system 120 through control of the voltage control module 208.

As further shown in FIG. 2, the voltage control module 208 is coupled along the electrical circuit between the power source 204 and the gas generation system 120. The voltage control module 208 is in one example coupled with the power measurement module 210. The power measurement module 210 is configured to measure the output of the power source 204 and thereby facilitate control and administration of the appropriate amount of electricity such as voltage, current or the like to the gas generation system 120 through the voltage control module 208. For instance, in one example the generation module 206 determines that one or more of extinguishing, ignition or throttling of gas generation from the gas generation system 100, 120 is desired. The voltage control module 208 is controlled by the flight module 206 to accordingly adjust the application of electrical energy such as voltage to the electrodes 122, 124. The power measurement module 120 measures the output of the power source 204 and accordingly cooperates with the voltage control module 208, for instance by way of feedback control using the output of the power source 204, to measure and adjust the amount of electricity provided to the gas generation system 120.

As previously described herein in one example the controller 202 includes a series of modules configured to control and operate the gas generation system 120. In one example, the controller 202 includes a generation module 206 configured to operate the gas generation system 120 (or 100) for instance through control of the voltage control module 208. In one example, the generation module 206 includes a plurality of modules each configured to control one or more functions of the gas generation system 120. For instance, referring again to FIG. 2 the generation module 206 includes one or more of an ignition module 212, an extinguishing module 214 and a throttling module 216. Each of these modules controls various corresponding functions of the gas generation system 120.

In one example, the ignition module 212 is configured to control the application of electrical energy to the gas generation system 120 in an ignition configuration, for instance where ignition of the electrically operated propellant 108 shown in FIGS. 1A, 1B is desired. In another example, the extinguishing module 214 is conversely configured to interrupt the application of electricity to the propellant 108 and thereby extinguish the electrically operated propellant when such interruption of gas generation is desired. In one example, the extinguishing module 214 cooperates with the voltage control module 208 to provide a shut-off function to the electrically operated propellant 108 when extinguishing of the electrically operated propellant (even at high pressures greater than 200 psi) is desired. Because the electrically operated propellant is not self-sustaining, even at pressures approaching 2000 psi, the extinguishing module is configured to shut the propellant down in high pressure environments.

Optionally, the control system 200 further includes a throttling module 216 configured to graduate the application of electrical energy to the electrically operated propellant 108. In one example, the electrically operated propellant 108 is able to throttle its burn (increase or decrease the burn rate) according to the application of electrical energy to the propellant 108 (an initial voltage compared to an increased voltage and decreased voltage for corresponding changes to the burn rate). For instance, the throttling module 216 controls the voltage control module 208 to apply additional electrical energy to the gas generation system 120 when increased gas generation (thrust in the case of a rocket motor 102) is desired. Conversely, the throttling module 216 is also configured to decrease the application of electrical energy to the electrically operated propellant 108 through the voltage control module 208 when a decrease of gas generation is desired, for instance to decrease the thrust provided by a rocket motor 102 including one or more of the gas generation systems 100, 120.

In another example, the control system 200 includes a pressure monitoring module 218 in communication with a pressure sensor 220 as shown in FIG. 2. The pressure sensor 220 is in one example coupled with the combustion chamber 104 and is able to measure the pressure within the combustion chamber 104 and thereby accordingly measure the pressure incident on the electrically operated propellant 108, in one example, the electrically operated propellant 108 requires differing power outputs for ignition as well as sustaining of burning of the propellant after ignition. For instance, at ignition the electrically operated propellant 108 requires in one example around 800 joules per gram of electricity for the electrically operated propellant to ignite. In another example, the electrically operated propellant requires significantly less electrical input to sustain burning of the propellant 108 (e.g., 150 to 250 joules per gram, an in another example 200 joules per gram or less). Accordingly, in one example, the pressure sensor 220 is configured to measure the pressure within the combustion chamber 104 to determine burn rate and thrust and accordingly assist in determining when ignition begins and ceases within the gas generation system 100, 120. Upon determination of the ignition of the electrically operated propellant 108 the pressure monitoring module 218 cooperates with the voltage control module 208 to reduce the amount of electrical energy applied to the propellant 108 and thereby conserve energy of the power source 204.

In yet another example, the pressure monitoring module 218 cooperates with the pressure sensor 220 to determine and measure the pressure within the combustion chamber 104 to accordingly monitor the thrust provided by the gas generation system 100, 120, for instance through the nozzle 112 shown in FIG. 1A. In this example, the pressure monitoring module 218 and the pressure sensor 220 are thereby able to measure the pressure and accordingly the thrust of the rocket motor 102 and cooperate with the throttling module 216 to throttle the burn of the electrically operated propellant to adjust the amount of gas generation and thrust provided by the gas generation systems 100, 120.

Additionally the pressure monitoring module 218 and the pressure sensor 220 may operate in cooperation in other circumstances besides those of a rocket motor 102. For instance, in a gas generation system, such as a gas compressor using the electrically operated propellant 108, the pressure monitoring module 218 and the pressure sensor 220 cooperate to make sure the pressure within the gas generation system (applied to a gas or the pressure supplied in the stream of exhaust gas from the propellant 108) is at a desired pressure, for instance 200 psi or more.

As previously described herein, the electrically operated propellants such as the propellant shown in FIGS. 1A and 1B includes a plurality of components configured to facilitate the electrical operation of the propellant while at the same time enabling the extinguishing of the propellant at a range of pressures for instance pressures form ambient atmosphere, to greater than 200 psi, and less than or equal to 2000 psi. In one example, a combustion chamber such as the combustion chamber 104 shown in FIG. 1A reaches pressures between 200 and 2000 psi (e.g., pressures within a rocket motor). The electrically operated propellant 108 configured as described herein is able to ignite and extinguish within the high pressure environment of the combustion chamber 104. For instance, at pressures between at least ambient pressure and 2000 psi the electrically operated propellant 108 is able to extinguish with the interruption of electricity applied to the electrodes 110. Stated another way, the electrically operated propellant 108 is not self-sustaining at high pressures (e.g., does not continue to burn without electrical input) and is thereby operated according to the application of electrical energy from the electrodes 110 throughout the operation of the gas generation system (100, 120).

As described herein, the electrically operated propellant in one example is a solid fuel having a plurality of components including, but not limited to, an oxidizer, a fuel, and a binder. In one example, the oxidizer is a liquid perchlorate based oxidizer comprising approximately 50 to 90 percent of the total mass of the electrically operated propellant 108. A liquid perchlorate based oxidizer includes but is not limited to perchlorate based oxidizers such as aluminum perchlorate, barium perchlorate, calcium perchlorate, lithium perchlorate, magnesium perchlorate, perchlorate acid, strontium perchlorate, sodium perchlorate and the like as shown in the table below. The preceding list is not intended to be limiting but merely provides examples for use with the electrically operated propellant 108.

Electrically Operated Propellant

| Oxidizer - Liquid Based Perchlorate Oxidizer (50 to 90 percent by mass) |
| --- |
| aluminum perchlorate, barium perchlorate, calcium perchlorate, lithium perchlorate, magnesium perchlorate, perchlorate acid, strontium perchlorate, sodium perchlorate |
| Fuel - Metal Based Fuel (5 to 30 percent by mass) |
| tungsten, magnesium, copper oxide, copper, titanium, aluminum |
| Binder (remainder) |
| casein, methyl cellulose, polyethylene oxide, polyvinyl acetate, polyvinyl alcohol |

Additionally, the electrically operated propellant 108 in another example includes a fuel. The fuel comprises approximately 5 to 30 percent by mass of the electrically operated propellant 108. In one example, the fuel includes but is not limited to a metal based fuel. As previously described herein, the metal based fuel assists in the ignition and extinguishing of the electrically operated propellant 108. For instance, the provision of a metal based fuel increases the conductance of the electrically operated propellant 108 and thereby facilitates the application of electricity to the propellant for ignition. Conversely, the metal based fuel retards combustion of the propellant because of the low flammability of the metal. Accordingly, the metal based fuel thereby retards combustion of the electrically operated propellant 108 and facilitates the extinguishing of the propellant upon interruption of electricity. As shown in the table provided above, the metal based fuel includes, but is not limited to, tungsten, magnesium, copper oxide, copper, titanium and aluminum. The preceding list is not intended to be limiting but merely provides examples for use with the electrically operated propellant 108. Optionally, the electrically operated propellant 108 is formed without a fuel (e.g., having a fuel mass percentage of 0).

In another example, the electrically operated propellant 108 as described herein includes a third component including, but not limited to, a binder. The binder in one example comprises the remainder of the mass percentage of the electrically operated propellant 108. In one example, the binder includes but is not limited to casein, methyl cellulose, polyethylene oxide, polyvinyl acetate, polyvinyl alcohol or the like. The binder in one example cooperates with the oxidizer and the fuel to combine these components into a solid fuel propellant shapeable into any configuration such as the cylindrical configurations provided in FIGS. 1A and 1B. As described herein, the electrically operated propellant 108 has a storage modulus sufficiently high to allow for the maintenance of the shape the propellant is molded into at manufacture. For instance, the electrically operated propellant 108 has a storage modulus of 300 psi or greater at ambient temperature that accordingly allows the propellant 108 in either of the configurations shown in FIGS. 1A, 1B or other configurations to maintain its shape through dynamic conditions including, but not limited to, pressurization, launch and flight. The propellant 108 with a consistent shape accordingly maintains a predictable performance profile as the shape and surface area of the propellant are relatively static during operation. The electrically operated propellant 108 is thereby formable (e.g., can be cast or molded) into any number of grain configurations and reliably perform with a desired performance profile (thrust dictated at least in part by the grain surface area) even when subject to dynamic conditions.

The electrically operated propellant 108 with the components described above is able to ignite and extinguish with the respective application and interruption of application of electricity to the propellant over a range of pressures, from ambient pressure to high pressures of the type found in a rocket motor. The electrically operated propellant 108 is able to extinguish itself even while at high pressures, for instance the pressures of a combustion chamber 104 of a rocket motor 102. These pressures range from more than 200 psi to 2000 psi. With the interruption of electrical energy to the electrically operated propellant 108 the propellant ceases burning and extinguishes itself within the combustion chamber 104. In one example, the metal based fuel and the liquid perchlorate based oxidizer cooperate to facilitate the ignition and extinguishing of the electrically operated propellant 108 subject to these conditions. Additionally, the liquid perchlorate based oxidizer cooperates with the metal based fuel to ensure that the varied application of electrical energy to the electrically operated propellant 108 correspondingly throttles the gas output of the electrically operated propellant (e.g., with an adjustable burn rate based on the graduation of electrical potential or current applied to the propellant).

Additionally, the electrically operated propellant 108 is configured to minimize the power source 204 by requiring a smaller relative input compared to other electrically operated propellants to ignite and sustain burning of the propellant. For instance, the electrically operated propellant 108 has a relatively small specific energy of approximately 600 to 1100 joules per gram (e.g., in one example 800 joules per gram) compared to other electrically operated propellants with significantly higher specific energies (e.g., specific energies of around 2400 joules per gram or greater). In one example, the metal based fuel including for instance tungsten therein cooperates with the liquid perchlorate based oxidizer to ensure that a relatively small application of electrical energy equivalent to 800 joules per grain is able to initiate ignition of the electrically operated propellant 108. Additionally, with the provision of a metal based fuel the specific energy needed to sustain burning of the electrically operated propellant 108 is also minimized (for instance 200 joules per gram is sufficient to maintain combustion of the propellant 108). Because of the relatively low specific energy requirements of the electrically operated propellant 108 in these two or more configurations (ignition and sustained burning) ignition as well as throttling through the application of varied electrical input is attained with a relatively small power source. Accordingly, a system such as the gas generation system 100 including the rocket motor 102 only requires a small power source such as the power source 204 shown in FIG. 2 as opposed to larger battery power sources otherwise provided with other electrically operated propellants having higher specific energy requirements. For instance the power source is configured in one example to provide ignition power of 800 joules per gram and sustained power of 200 joules per gram with variation according to differing propellant formulation permutations as provided herein.

The electrically operated propellant 108 is also able to maintain its shape, for instance during launch and flight of the gas generation systems 100, 120 as part of a rocket motor 102 (or other device exposed to dynamic kinematic conditions). In one example, the electrically operated propellant 108 has a storage modulus of 300 psi or greater at room temperature. With the incorporation of other binders the electrically operated propellant 108 may have a greater elastic modulus that thereby allows the maintenance of the shape of the electrically operated propellant 108 under even greater stresses. By providing the electrically operated propellant with a higher modulus of elasticity relative to other electrically operated propellants (e.g., with an elastic modulus of around 60 psi or less at mom temperature) the propellant 108 is able to maintain a desired shape throughout operation of the gas generation system 100, 120. Accordingly, the burn rate and other performance characteristics for the propellant 108 are predictably maintained throughout the operation of the systems 100, 120. That is to say, the propellant is not subject to significant cracking or deformation under dynamic conditions including launch and flight of a rocket. Phenomena such as slumping, flattening or cracking of the electrically operated propellant 108 are thereby substantially avoided and correspondingly the electrically operated propellant has a predictable mechanical and performance profile.

Additionally, the combination of the liquid perchlorate based oxidizer as well as the metal based fuel in at least some examples provides an electrically operated propellant 108 that is configured for storage for significant periods of time while at the same time maintaining its performance characteristics. For instance, in one example, one or more of the gas generation systems 100, 120 (for instance when incorporated into the rocket motor 102) are provided to an end user the systems 100, 120 are often stored within enclosed spaces such as crates for extended periods of time such as months, years or the like. Often these systems 100, 120 are stored in areas that are not well ventilated and are subject to heat from nearby components, exterior heating such as solar heating and the like. The electrically operated propellant 108 described herein is able to maintain its performance characteristics for instance its total impulse value, ignition rise time, peak pressure, weight propellant density and the like throughout the storage period even while the electrically operated propellant 108 is exposed to temperatures approaching 140 degrees Fahrenheit.

For instance, in one example, the electrically operated propellant 108 has an initial impulse value of 800 pound seconds at an initial rise time and has a mature impulse value, again, of approximately 800 pound seconds at a second time after storage of the gas generation systems 100, 120 for at least 30 days at a temperature of around 140 degrees Fahrenheit. As described herein the mature impulse value remains substantially the same compared to the initial impulse value (e.g., of 800 pound seconds in one example) even with storage under these conditions. In other examples, the electrically operated propellant 108 is stored under these conditions for much longer periods of time for instance a year, two years, five years, ten years or more while at the same time substantially maintaining the mechanical properties and total impulse value (and other performance characteristics) from the initial configuration to the mature configuration at these later times.

Figure 3A:
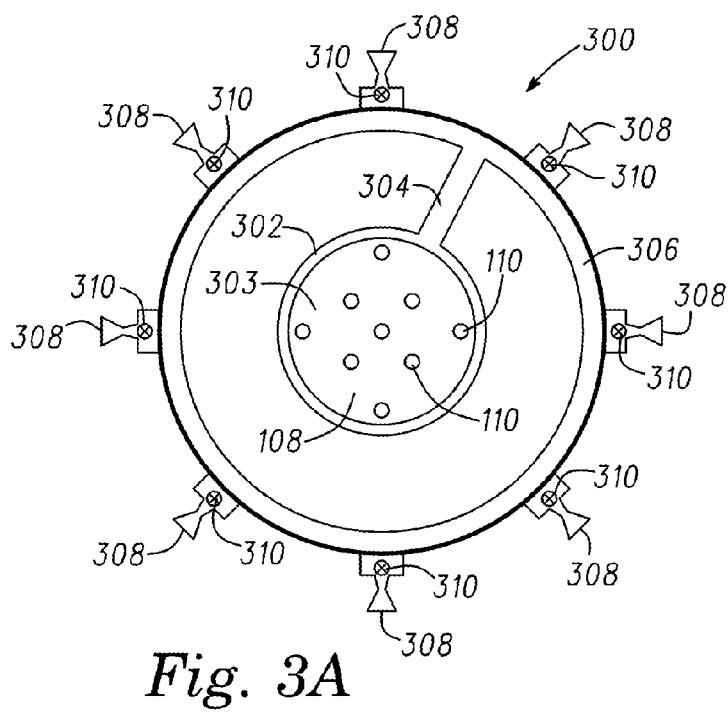
FIG. 3A is a schematic view of one example of a divert attitude and control system including an electrically operated propellant in selective communication with a plurality of nozzles.
Figure 3B:
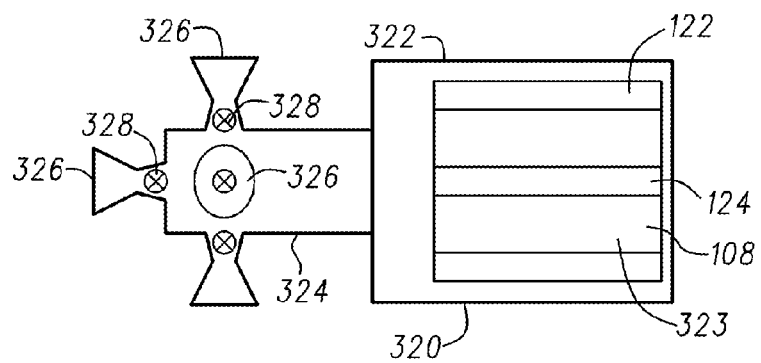
FIG. 3B is a schematic view of another example of a divert attitude and control system.
Figure 3C:
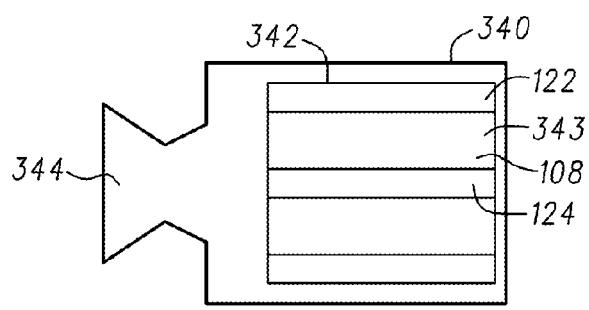
FIG. 3C is a schematic view of one example of a microthruster including an electrically operated propellant.

FIGS. 3A, 3B and 3C show three examples of assemblies using the electrically operated propellant 108 previously described and shown in FIGS. 1A and 1B. In the first example shown in FIG. 3A, a divert attitude and control system 300 is provided including a plurality of thrusters 308 coupled by way of a manifold with the gas generation system 303. As shown in the figure, the gas generation system 303 is located within the housing of another device (e.g., a rocket body, satellite body, submersible or the like) and includes a combustion chamber 302 with the electrically operated propellant 108 therein. A plurality of electrodes 110 extend through the propellant 108. These components form a gas generation system 303 that is similar in at least some regards to the previously described gas generation systems 100, 120.

As shown in FIG. 3A, the gas generation system 303 is coupled with a system manifold 306 by way of a manifold coupling 304. In one example, the system manifold 306 is an annular ring extending around a housing, such as the housing for a rocket. The system manifold 306 is coupled with each of the plurality of thrusters 308. As shown in FIG. 3A, a plurality of valves (or other regulators) 310 are interposed between each of the thrusters 308 and the manifold 306.

Where directional thrust is required the divert attitude and control system 300 is operated to provide such thrust. For instance, as pressurized gas is needed for one or more of the thrusters 308 the gas generation system 303 including the electrically operated propellant 108 is operated. Electrical energy is applied through the electrodes 110 to initiate ignition of the electrically operated propellant 108. This correspondingly creates a stream of pressurized gas that is directed through the manifold coupling 304 to the system manifold 306. In one example, a controller for instance a controller, such as the control system 200 described herein, operates one or more of the valves 310 to accordingly direct the gas generated by the gas generation system 303 through the designated thrusters 308 to thereby provide desired attitude and vector adjustments to the overall device, such as a rocket.

When attitude control of the rocket is no longer desired the gas generation system 303 (e.g., the control system 200) extinguishes the electrically operated propellant 108 by interruption of electricity applied to the electrodes 110. As described herein, the electrically operated propellant 108 having the composition as provided extinguishes with the cessation of electricity even while high pressures are maintained within one or more of the combustion chamber 302, the manifold coupling 304 or the system manifold 306. Accordingly, the electrically operated propellant 108 may be stored and maintained indefinitely until needed again for additional attitude control of a rocket, satellite, submersible or the like.

Accordingly, the divert attitude and control system 300 allows for the selective adjustment of the attitude, vector and the like of assemblies while at the same time preserving the propellant 108 of the divert attitude and control system 300 over a long period of time. Additionally in at least some examples, the electrically operated propellant 108 included within the combustion chamber 302 as well as the manifold coupling 304 of the system manifold 306 provides a significantly smaller footprint to the overall device relative to a tank containing a pressurized volume of gas. For instance, in an application where a previous divert attitude and control system is desired in at least one example a pressurized tank of gas having a significant overall device foot print is provided and accordingly assumes substantial space and weight of the device housing the system. In contrast to the large volume of pressurized gas stored in previous divert attitude and control systems, the electrically operated propellant 108 as described herein is in a solid form and thereby has a much smaller footprint relatively and is able to correspondingly assume a smaller space within the overall device.

FIG. 3B shows another example of a divert attitude and control system 320. The system 320 shown in FIG. 3B is similar in at least some regards to the control system 300 previously shown in FIG. 3A. For instance, the divert attitude and control system 320 includes a combustion chamber 322 including the electrically operated propellant 108 therein as well as one or more electrodes. In the example shown in FIG. 3B, the electrodes 122, 124 are in a similar configuration to those shown in FIG. 1B. The electrodes 122, 124 as well as the electrically operated propellant 108 form the gas generation system 323. As shown the gas generation system 323 is in communication with a thruster mast 324 extending from the remainder of the combustion chamber 322. As further shown in FIG. 3B, the thruster mast 324 includes a plurality of thrusters 326 arranged around the mast and on at least one end. The thrusters 326 are spaced from the thruster mast 324 with interposing valves (or regulators) 328.

In a similar manner to the divert attitude and control system 300 the valves 328 of the divert attitude and control system 320 selectively direct gas generated from the gas generation system 323 through one or more of the thrusters 326 to correspondingly provide attitude control (and vector adjustments') to an overall device including the divert attitude and control system 320 (e.g., the rocket, satellite, marine submersible or the like). In the example shown in FIG. 3B, gas generated from the system 323 is directed through the thruster mast 324 in the manner of a manifold to each of the valves 328. The controller such as the control system 200 previously shown in FIG. 2 is in one example operated to selectively open one or more of the valves 328 to allow for exit of the gas generated from the system 323 through one or more of the thrusters 326. Accordingly, the divert attitude and control system 320 is thereby able to provide attitude and vector control to the overall device including the system 320.

FIG. 3C shows another example of a system configured for using the electrically operated propellant 108. In this example, the electrically operated propellant is incorporated within a microthruster 340. As shown the microthruster 340 includes a combustion chamber 342 including the electrically operated propellant 108 as well as the electrodes 122, 124. As with the other examples described herein, the electrically operated propellant 108 as well as the electrodes 122, 124 form a gas generation system 343. As shown in FIG. 3C, the gas generation system 343 is in direct communication with the thruster nozzle 344 of the microthruster 340 (in one option without an intervening valve or regulator). In one example, a plurality of microthrusters 340 are provided around a device such as a satellite housing, rocket body, submersible or the like. The microthrusters 340 are in one example controlled with a system similar in at least some regards to the control system 200. The control system 200 is configured to selectively initiate the ignition of the electrically operated propellant 108 (and extinguish) in one or more of the microthrusters 340. Accordingly, the microthrusters 340 when provided in a plurality around a larger device are thereby able to selectively adjust the attitude and vector of the device according to operation of one or more of the microthrusters 340. Additionally with the graduated application of electricity through the electrodes 122, 124 each of the microthrusters 340 are in one example able to provide a variable amount of thrust through the respective thruster nozzles 344.

Figure 4A:
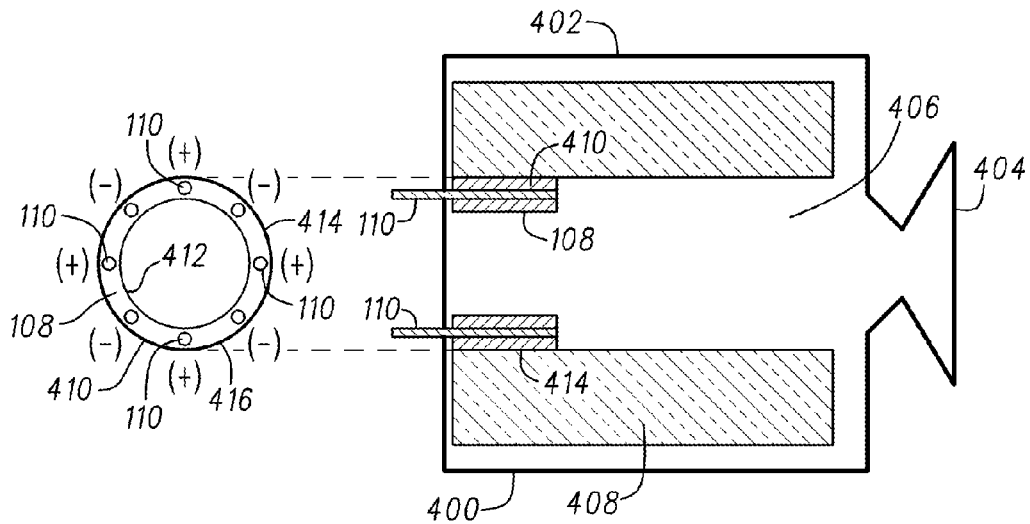
FIG. 4A is a schematic view of one example of a rocket motor including an electrically operated propellant ignition system for a solid rocket fuel.
Figure 4B:
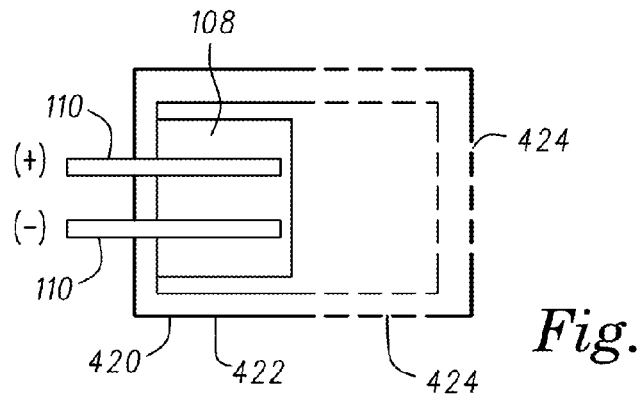
FIG. 4B is a schematic view of another example of an electrically operated propellant ignition system.
Figure 4C:
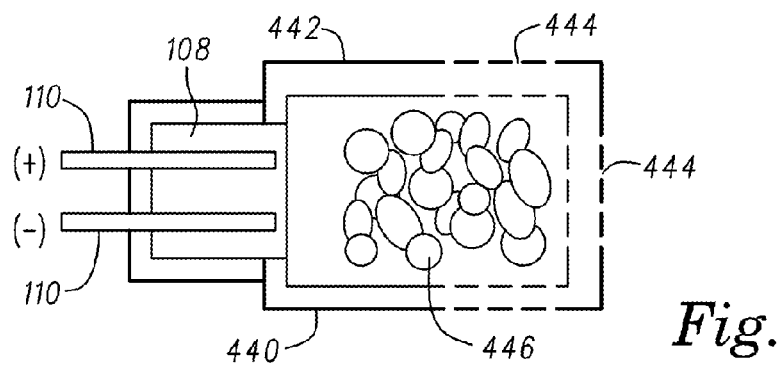
FIG. 4C is a schematic view of yet another example of an electrically operated propellant ignition system.

FIGS. 4A, 4B and 4C show examples of ignition assemblies including an electrically operated propellant 108 as previously described herein. Referring first to FIG. 4A a first gas generating ignition system 410 is provided. As shown the gas generating ignition system 410 is incorporated within a rocket motor 400. The rocket motor 400 includes a motor housing 402 having a rocket propellant 408 provided therein. In one example, the rocket propellant 408 is a solid rocket propellant having a combustion cavity 406 as shown in FIG. 4A. The motor housing 402 includes a rocket nozzle 404 sized and shaped to direct the exhaust gas from the rocket propellant 408 to thereby provide thrust.

Figure 5A:
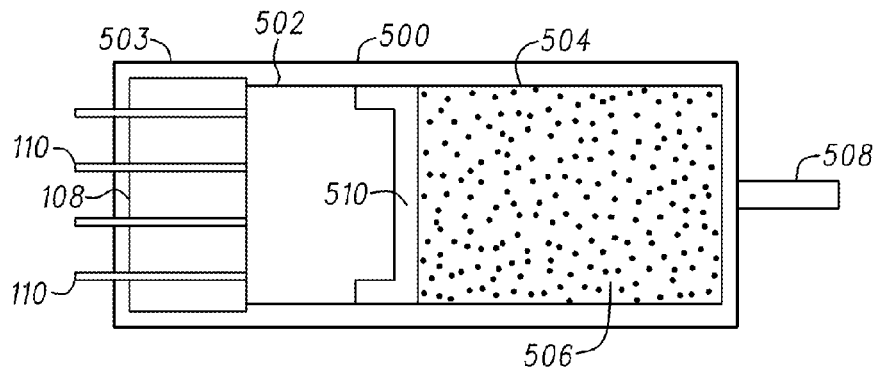
FIG. 5A is a schematic view of one example of a gas compressor including an electrically operated propellant configured to compress a gas or expel a liquid.

As shown in FIG. 4A, the gas generated ignition system 410 is coupled along the combustion cavity 406 of the rocket motor 400. For instance, the gas generating ignition system 410 includes an igniter ring 414 including the electrically operated propellant 108 as well as a plurality of electrodes 110 positioned therein. In one example, the igniter ring 414 includes an igniter inner ring surface 412 and an igniter outer ring surface 416 sized and shaped for engagement along the rocket propellant 408 as shown in FIG. 5A. In another example, the gas generating ignition system 410 is spaced from the rocket propellant 408 and is instead coupled with a solid component of the motor housing 402 other than the rocket propellant 408.

In operation, electricity is applied across the electrodes 110 to ignite the electrically operated propellant 108. As previously described herein, ignition of the electrically operated propellant 108 correspondingly produces a high temperature exhaust gas. The high temperature exhaust gas is directed along the rocket propellant 408 and correspondingly ignites the rocket propellant 408 to thereby operate the rocket motor 400.

FIG. 4B shows another example of a gas generating ignition system 420. In this example, the ignition system 420 includes an igniter basket 422 including the electrically operated propellant 108 as well as the electrodes 110 therein. As shown the igniter basket 422 includes a plurality of basket orifices 424 that allow the direction of streams of combustion gas from the electrically operated propellant for instance into a larger system including another propellant such as a rocket propellant.

In one example, the gas generating ignition system 420 is used in a system having a plurality of rocket propellant grains or propellant grains that are individually operated according to the ignition provided by the gas generating ignition system 420. For instance, in one example, the gas generating ignition system 420 is incorporated within a rocket motor having two or more individual rocket propellant grains. The gas generating ignition system 420 is ignited for instance by operation of the electrically operated propellant 108 and thereby correspondingly ignites a first propellant grain of the rocket motor. The gas generating ignition system 420 is thereafter deactivated, for instance by the interruption of electricity applied through the electrodes 110 to extinguish the electrically operated propellant 108. Upon consumption of the first rocket propellant grain and upon instruction for ignition of the second rocket propellant grain the gas generating ignitions system 420 is operated again with the renewed application of electricity through the electrodes 110 to correspondingly ignite the electrically operated propellant 108 and thereby ignite the second rocket propellant grain.

FIG. 4C shows yet another example of a gas generating ignition system 440 for instance a portion of a composite ignition train utilizing two or more ignition systems that cooperate to correspondingly ignite a larger propellant grain. In the example shown in FIG. 4C the igniter basket 442 includes the electrically operated propellant 108 therein as well as the electrodes 110. In addition, the igniter basket 442 includes an igniter grain 446 including, but not limited to, boron potassium nitrate pellets positioned within the igniter basket 442.

In one example, the gas generating ignition system 440 is operated by first applying an electrical input across the electrodes 110. The electrical input ignites the electrically operated propellant 108 as provided herein. The high temperature exhaust gases provided by the electrically operated propellant 108 are incident upon the igniter grain 446 and correspondingly ignite the igniter grain. The igniter grain 446 thereafter produces a stream of hot exhaust gases that are delivered through the igniter orifices 444 to another propellant, such as a rocket propellant. The gas generating ignition system thereby provides an ignition train configured to ignite one or more other propellants in communication with the gas generating ignition system 440.

Figure 5B:
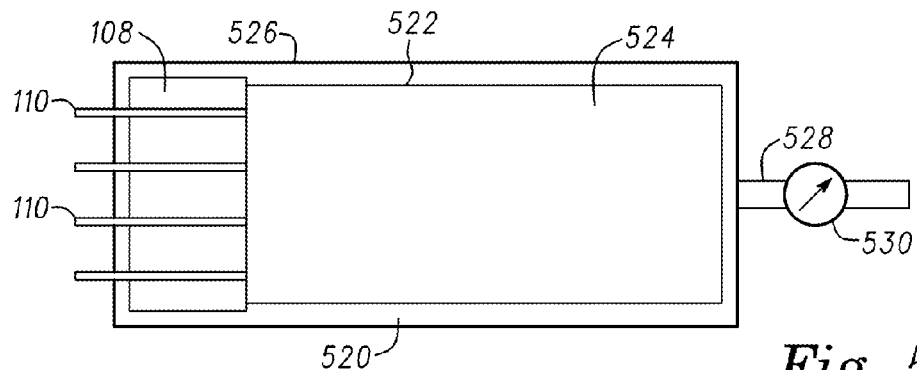
FIG. 5B is a schematic view of another example of a gas compressor configured to pressurized a propellant exhaust gas.

FIGS. 5A and 5B show two examples of compressors using an electrically operated propellant 108, such as the propellant previously described herein. Referring first to FIG. 5A, one example of a compressor 500 is shown including a compressor piston 515 dividing the compressor housing 503 into a separate combustion chamber 502 and a fluid chamber 504. As shown in the figure a fluid such as a gas, liquid or the like 506 is provided within the fluid chamber 504. The combustion chamber 502 is in communication with the electrically operated propellant 108 and the electrically operated propellant 108 is coupled with the electrodes 110.

In operation, the electrically operated propellant 108 is ignited for instance by the application of electricity across the electrodes 110. The electrically operated propellant produces a gas under pressure within the combustion chamber 502. The pressurized gas forces the compressor piston 510 to the right and into the fluid chamber 504 thereby compressing the fluid 506 (if a gas or pressurizing a liquid). As shown, the compressed fluid 506 is delivered through the fluid outlet 508 for instance for use in one or more applications requiring compressed fluids such as compressed air, pressurized oils or the like.

As previously described herein, the electrically operated propellant 108 is configured for selective ignition and extinguishing according to the application or interruption of electricity through the electrodes 110. Further the electrically operated propellant 108 when ignited creates exhaust gases and within the combustion chamber 502 the exhaust gases raise the pressure therein to correspondingly move the compressor piston 510 and compress the fluid 506. Accordingly, the electrically operated propellant 108 is also under pressure while generating the gas within the combustion chamber 502. As previously described herein, the electrically operated propellant 108 is configured to extinguish even at higher pressures for instance pressures of 200 psi or greater all the way up to 2000 psi. Accordingly, with the interruption of electricity to the electrodes 110 the compressor 500 is shut down and accordingly the remainder of the electrically operated propellant 108 is preserved until compression of a fluid within the fluid chamber 504 is desired.

Additionally and as described herein, the electrically operated propellant 108 is also operated in a throttling manner for instance a variable electrical input is applied across the electrodes in a graduated manner to correspondingly ignite and burn the electrically operated propellant 108 at various burn rates. The varied application of electricity to the propellant 108 adjusts the burn rate and produces a pressurized gas having varied pressure to correspondingly pressurize the fluid 506 to varying degrees as needed by the application for the compressor 500.

FIG. 5B shows another example of a compressor 520. In this example, the compressor 520 does not include the compressor piston 510 or the divided chambers of the compressor 500 previously described above. For instance, the compressor 520 includes a combustion storage chamber 522 having the electrically operated propellant 108 and the electrodes 110 therein. As shown in FIG. 5B, the compressor 520 is included within a compressor housing 526 and a fluid outlet 528 extends from the compressor housing 526. The fluid outlet 528 is in direct communication with the combustion storage chamber 522 and is selectively opened, closed and throttled for instance with a valve or regulator 530.

When operation of the compressor 520 is desired an electrical input is applied to the electrodes 110 to correspondingly ignite the propellant 108. The burning propellant generates a pressurized gas that is received within the combustion storage chamber 522 and builds in pressure. The valve or regulator 530 is selectively operated to open the fluid outlet 528 and allow for the delivery of the compressed exhaust gas of the electrically operated propellant 108 for one or more applications. In the example shown in FIG. 5B, the exhaust gas of the electrically operated propellant 108 is thereby used as the compressed gas for the compressor 520 as opposed to the separate fluid 506 within the fluid chamber 504 of the compressor 500. As with the compressor 500 the electrically operated propellant 108 is selectively operated to ignite, extinguish and throttle the respective ignition, burning and extinguishing of the propellant 108 to thereby correspondingly produce pressurized gas according to the input applied to the propellant 108 by the electrodes 110. That is to say, either of the compressors 500, 520 described herein are able to provide a source of pressurized gas at one or more pressures (graduated pressures according to the application of electricity) for use by way of delivery through the respective fluid outlets 508, 528.

Figure 6:
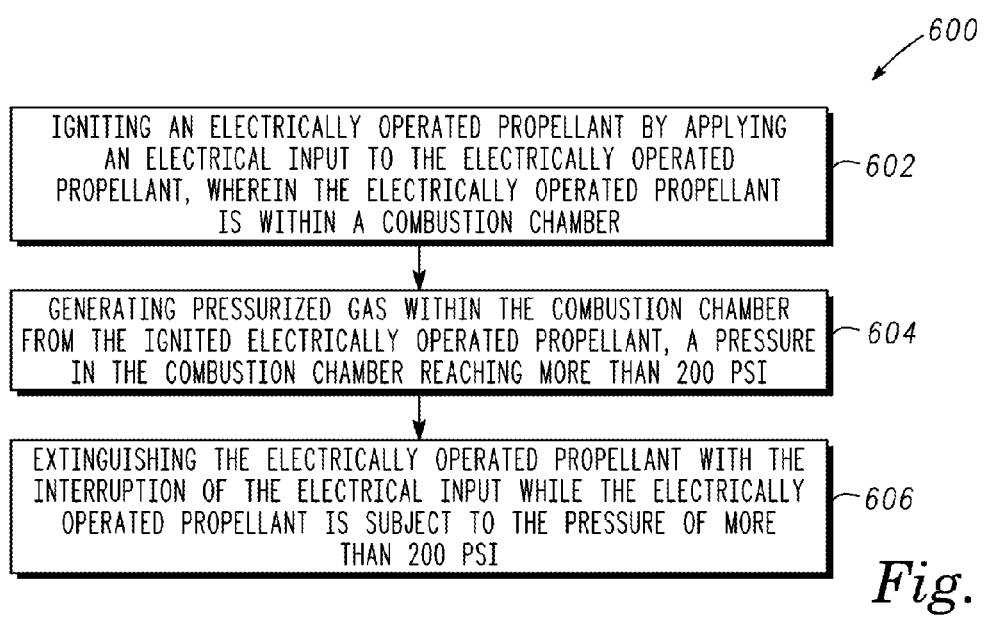
FIG. 6 is a block diagram showing one example of a method for using an electrically operated propellant.

FIG. 6 shows one example of a method 600 for using an electrically operated propellant, such as the propellant 108 previously described herein. In describing the method 600 reference is made to one or more components, features, functions and the like described herein. Where convenient, reference is made to the components and features with reference numerals. Reference numerals provided are exemplary and are not exclusive. For instance, the features, components, functions and the like described in the method 600 include, but are not limited to, the corresponding numbered elements, other corresponding features described herein (both numbered and unnumbered) as well as their equivalents.

At 602, the method 600 includes igniting an electrically operated propellant 108 by applying an electrical input to the electrically operated propellant. The electrically operated propellant 108 in one example is within a combustion chamber 104 previously shown in FIG. 1A. Optionally, a plurality of electrodes (110, 122, 124) extend through at least a portion of the electrically operated propellant 108 to provide the electrical input to the propellant.

At 604, the method 600 includes generating pressurized gas within the combustion chamber 104 from the ignited electrically operated propellant 108. In one example, a pressure in the combustion chamber is greater than ambient pressure. For instance, the pressure in the combustion chamber reaches more than 200 psi therein. As described herein, in one example, the pressurized gas is delivered through a nozzle, such as a rocket nozzle 112 shown in FIG. 1A, to correspondingly provide thrust for a rocket motor 102. In another example, the pressurized gas generated by the electrically operated propellant 108 is used in a divert attitude and control system such as any of the control systems 300, 320, 340 shown in FIGS. 3A-C. In yet another example, the exhaust gas provided by the electrically operated propellant 108 is a high temperature gas used to ignite one or more propellants such as a rocket propellant 408 shown in FIG. 4A or an igniter grain 446 in an ignition train of a gas generating ignition system for instance for use with another assembly such as a rocket motor. In still another example, the pressurized gas generated by the electrically operated propellant 108 is used to compress fluids such as air, liquid or the like in compressors such as the compressor 500. In yet another example, a compressor 520 uses the pressurized gas generated by the electrically operated propellant 108 as a stream of pressurized gas for use in a variety of applications.

At 606, the electrically operated propellant 108 is extinguished with the interruption of the electrical input. In one example, extinguishing of the electrically operated propellant 108 is accomplished at a variety of pressures including pressures across a range from ambient pressure to around 2000 psi. In another example, extinguishing the electrically operated propellant includes extinguishing the propellant 108 at pressures greater than 200 psi. That is to say, the electrically operated propellant 108, even at high pressures such as pressures greater than 200 psi and less than or equal to 2000 psi, is not self-sustaining. Stated another way, with the interruption of the application of electricity to the electrodes 110 (122, 124) the electrically operated propellant 108 is self-extinguishing and thereby ceases the generation of high pressure exhaust gases (shuts off). Accordingly, where a gas generation system such as either of the gas generation systems 100, 120 is incorporated into an environment wherein the pressure around the electrically operated propellant 108 will rise the electrically operated propellant maintains a self-extinguishing property throughout the range of pressures to thereby ensure that the electrically operated propellant 108 may be shut down throughout the operation of a gas generation system (including, a rocket, attitude and control system, compressor or the like incorporating the propellant 108).

Several options for the method 600 follow. In one example, igniting and extinguishing of the electrically operated propellant 108 is repeated at one or more stages during launch or flight of the launch vehicle. For instance, as stated herein, in one example a rocket motor such as the rocket motor 102 includes the electrically operated propellant 108 therein. With the repeated ignition and extinguishing of the propellant 108 corresponding stages of thrust are provided to the rocket motor 102. That is to say with a single grain of the electrically operated propellant 108 a rocket motor 102 is able to stage the application of thrust by way of the application and interruption of electricity to the propellant 108, in another example, where the electrically operated propellant 108 is used in an ignition system the ignition and extinguishing of the propellant 108 is used to correspondingly ignite a plurality of rocket propellant grains within the rocket motor.

In another example, the method 600 further includes changing the electrical input applied to the electrically operated propellant 108 (for instance, through the electrodes 110) to change a burn fate of the propellant 108 and correspondingly change the rate of generation of the pressurized gas from a first rate to a differing second rate. In one example, the electrical input applied to the electrically operated propellant 108 is in one example a first input, such as a first voltage. The electrically operated propellant 108 has a first burn rate corresponding to the first voltage. Where an increase in thrust corresponding to an increase in the burn rate of the propellant 108 is desired the voltage is raised to a second input, for instance a higher voltage relative to the first voltage. Conversely where a smaller thrust is desired the corresponding rate of gas generation is correspondingly lower. In this circumstance the second input voltage applied through the electrodes 110 to the propellant 108 is correspondingly lower to lessen the generation of gas from the electrically operated propellant 108.

In another example, the method 600 further includes storing the electrically operated propellant 108 for at least 30 days at a temperature of around 140 degrees Fahrenheit. The electrically operated propellant 108 has an initial total impulse value at an initial time, for instance at the beginning of the 30 day span, and it has a mature total impulse value after the 30 day span of storage at high storage temperature conditions (or corresponding initial and mature values of one or more performance characteristics). The initial and mature total impulse values of the electrically operated propellant 108 are substantially the same at both the beginning and the end of the 30 day span. That is to say the performance characteristics of the electrically operated propellant are maintained even after the propellant 108 is stored for instance for 30 days or more at temperatures of 140 degrees Fahrenheit. In one example, the impulse value of the propellant is approximately 800 pound seconds both as the initial impulse value and as the mature impulse value.

Method 600 further includes in another example controlling a shape of the electrically operated propellant 108 according to a propellant elastic modulus. In one example, the propellant elastic modulus is at least 300 psi or more at room temperature during one or more of launch or flight of a launch vehicle for instance the rocket motor 102 including the electrically operated propellant 108 therein. That is to say, the electrically operated propellant 108 with an elastic modulus of 300 psi or more is able to substantially maintain its shape while subject to age related or dynamic kinematic conditions. Accordingly, the performance characteristics of a propellant grain including the electrically operated propellant 108 therein are substantially the same after launch, flight or other dynamic conditions, and the electrically operated propellant 108 behaves in a predictable fashion based on its maintained shape and other propellant characteristics.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein," Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A gas generation system with an electrically operated propellant comprising:
   a combustion chamber;
   at least two electrodes configured for coupling with an electrical power source;
   an electrically operated propellant within the combustion chamber, the electrically operated propellant is configured to extinguish at pressures greater than 200 psi, the at least two electrodes are coupled with the electrically operated propellant; and
   wherein the electrically operated propellant is configured to ignite at an ignition condition and extinguish under an extinguishing condition,
      in the ignition condition an electrical input is applied across the electrodes to ignite the electrically operated propellant, and
      in the extinguishing condition the electrical input is interrupted, the pressure within the combustion chamber is greater than 200 psi, and the electrically operated propellant transitions from ignited to extinguished.

2. The gas generation system of claim 1, wherein the electrically operated propellant is configured to extinguish at pressures of between 200 and 2000 psi, and in the extinguishing condition the pressure within the combustion chamber is between 200 and 2000 psi.

3. The gas generation system of claim 1, wherein the electrically operated propellant includes:
   a liquid perchlorate based oxidizer,
   a binder, and
   a fuel.

4. The gas generation system of claim 3, wherein the fuel is a metal based fuel, and the metal based fuel in cooperation with the liquid perchlorate based oxidizer provides the electrically operated propellant with a specific energy of 600 to 1100 Joules per gram at ambient pressure.

5. The gas generation system of claim 3, wherein the fuel includes a metal based fuel in a ratio of 5 to 30 percent by mass of the electrically operated propellant.

6. The gas generation system of claim 5, wherein the metal based fuel includes tungsten in a ratio of around 10 to 25 percent by mass of the electrically operated propellant.

7. The gas generation system of claim 1, wherein the electrically operated propellant has an elastic modulus of 300 psi or greater at room temperature.

8. The gas generation system of claim 1 comprising at least one nozzle in communication with the combustion chamber.

9. The gas generation system of claim 1 comprising a controller coupled with an electrical power source coupled with the at least two electrodes, the controller is configured to control ignition, extinguishing and throttling of the electrically operated propellant, and the controller includes:

an ignition module configured to control the application of the electrical input to the electrodes at the ignition condition, an extinguishing module configured to interrupt the application of the electrical input to the electrodes at the extinguishing condition, and a throttling module configured to adjust the application of the electrical input to change a burn rate of the electrically operated propellant.

10. The gas generation system of claim 9, wherein the controller includes a pressure monitoring module, and one or more of the ignition, extinguishing and throttling modules communicate with the pressure monitoring module to control one or more of the ignition, extinguishing and throttling of the electrically operated propellant according to a monitored pressure.

11. An electrically operated propellant comprising:

a liquid perchlorate based oxidizer of approximately 50 to 90 percent of the mass of the electrically operated propellant;

a binder of approximately 10 to 30 percent of the mass of the electrically operated propellant;

a metal based fuel of approximately 5 to 30 percent of the mass of the electrically operated propellant; and wherein the electrically operated propellant is configured to ignite and extinguish according to the respective application and interruption of an electrical input to the electrically operated propellant.

12. The electrically operated propellant of claim 11, wherein the liquid perchlorate based oxidizer is an aqueous solution having an oxidizer concentration of at least 70 to 90 percent.

13. The electrically operated propellant of claim 11, wherein the metal based fuel in cooperation with the liquid perchlorate based oxidizer provides the electrically operated propellant with a specific energy of around 600 to 1100 joules per gram at ambient pressure.

14. The electrically operated propellant of claim 11, wherein the metal based fuel includes tungsten in a ratio of around 20 percent by mass of the electrically operated propellant.

15. The electrically operated propellant of claim 11, wherein the electrically operated propellant has an initial total impulse value at an initial time, and a mature impulse value at a second time after storage for at least 30 days at a temperature of around 140 degrees Fahrenheit, and the mature total impulse value is substantially the same as the initial impulse value.

16. The electrically operated propellant of claim 11, wherein the electrically operated propellant is configured to extinguish while subject to pressures of greater than 200 psi to around 2000 psi with the interruption of an electrical input.

17. The electrically operated propellant of claim 11, wherein the liquid perchlorate based oxidizer is configured to ignite the electrically operated propellant after the electrically operated propellant is stored for at least 30 days at a temperature of around 140 degrees Fahrenheit.

18. A method of using an electrically operated propellant located within a combustion chamber comprising:

igniting an electrically operated propellant by applying an electrical input to the electrically operated propellant;

generating pressurized gas within the combustion chamber from the combustion of the ignited electrically operated propellant, pressure in the combustion chamber reaching more than 200 psi; and extinguishing the electrically operated propellant with the interruption of the electrical input while the electrically operated propellant is subject to the pressure of more than 200 psi.

19. The method of claim 18 comprising directing the pressurized gas through at least one nozzle extending from the combustion chamber.

20. The method of claim 19, wherein igniting and extinguishing of the electrically operated propellant are repeated at one or more stages during launch or flight of a launch vehicle.

21. The method of claim 19, wherein directing the pressurized gas through at least one nozzle includes selectively directing the pressurized gas through two or more nozzles according to an attitude control instruction.

22. The method of claim 18 comprising changing the electrical input applied to the electrically operated propellant to change a burn rate of the electrically operated propellant and correspondingly change a rate of generation of the pressurized gas from a first rate to a second rate different from the first rate.

23. The method of claim 18 comprising igniting a second propellant with the generated pressurized gas.

24. The method of claim 18 comprising storing the electrically operated propellant for at least 30 days at a temperature of around 140 degrees Fahrenheit, the electrically operated propellant has an initial total impulse value before storage and a mature total impulse value after storage, wherein the initial and mature total impulse values are substantially the same.

25. The method of claim 18 comprising compressing a second gas with the pressurized gas.

26. The method of claim 18 comprising controlling a shape of the electrically operated propellant according to a propellant elastic modulus of at least 300 psi at room temperature during one or more of launch and flight of a launch vehicle including the electrically operated propellant therein.

27. The method of claim 18, wherein extinguishing the electrically operated propellant includes extinguishing the electrically operated propellant with the interruption of the electrical input while the electrically operated propellant is subject to the pressure of more than 200 psi to 2000 psi.

* * * * *